3,078,244
COMPOSITION COMPRISING AN AQUEOUS DISPERSION OF A METHYL METHACRYLATE COPOLYMER WHICH HAS AN ORGANIC FUSION-AID DISSOLVED THEREIN
Aubert H. Bibolet, Feasterville, Pa., George L. Brown, Moorestown, N.J., and George A. Richter, Jr., Abington, and Robert P. Fellmann, Levittown, Pa., assignors to Rohm & Haas Company, Philadelphia, Pa., a corporation of Delaware
No Drawing. Filed Dec. 15, 1958, Ser. No. 780,217
16 Claims. (Cl. 260—29.6)

This invention is concerned with aqueous spinning compositions comprising water-insoluble emulsion polymers of a mixture of methyl methacrylate and at least one other copolymerizable monoethylenically unsaturated monomer (or monovinylidene compound) in which the proportion of methyl methacrylate is at least 50% by weight of the total weight of monomers and is preferably at least 60% by weight thereof. It is particularly concerned with such compositions which also contain an agent hereinafter termed "fusion-aids" which improves the spinning and handling of the compositions.

This application is a continuation-in-part of our copending application Serial No. 711,545, filed January 28, 1958, now abandoned, which is in turn a continuation-in-part of our copending application United States Serial No. 532,789, filed September 6, 1955, now United States Patent 2,914,376.

A compound which is effective as a fusion-aid has solubility in the polymer with which it is to be used and has a favorable distribution coefficient toward polymer in a polymer-water system. A fusion-aid is a solvent for the copolymer which remains substantially completely dissolved within the copolymer particles in the aqueous dispersion. It should not be highly volatile but preferably is removable by vaporization or distillation during the fuse-drying stage of fiber production as described in the above-identified application for patent.

Since a fusion-aid must be a solvent for a given copolymer, it is first of all examined for its solubilizing action. A portion of 0.5 gram of copolymer is taken up in 25 ml. of the proposed fusion-aid. If the copolymer fails to dissolve, the liquid under examination is obviously not a fusion-aid. If the copolymer dissolves, it must not be precipitated from solution upon addition of water to the solution. Thus, 5 ml. of water is added to the above solution, the resulting mixture is stirred for about five minutes, and the stirred mixture is left standing for fifteen minutes. If layers form without precipitation of polymer, the liquid under examination can be used as a fusion-aid. It is preferred that fusion-aids boil below about 400° C.

To illustrate the selection of organic liquids as fusion-aids there is cited a case wherein there was prepared a dispersion of a copolymer of 87 parts by weight of methyl methacrylate and 13 parts of ethyl acrylate. Solid polymer was separated by freeze-drying. It was washed with water to remove soap and other water-soluble components. Residual monomers were removed with benzene-denatured ethanol. The copolymer was then dried to constant weight under reduced pressure at about 30° C. One-half gram portions were added to 25 ml. each of a variety of organic liquids. The copolymer was insoluble in adiponitrile and adiponitrile was found of no value in spinning this particular copolymer. The copolymer was soluble in ethoxyethanol, dioxane, and dibutyl phthalate, but was precipitated from these solvents when a 5.0 ml. portion of distilled water was added to their solutions, and the resulting mixture was stirred for five minutes and allowed to stand fifteen minutes. They were found to be of no assistance in spinning this particular copolymer and were not fusion-aids therefor. The copolymer was soluble in toluene, xylene, chlorinated hydrocarbons, ethyl acetate, and butyl acetate and was not precipitated from solutions therein when a 5.0 ml. portion of distilled water was added to each of such solutions, and the resulting mixture was stirred five minutes and allowed to stand fifteen minutes. These liquids were all of value in forming fibers from this copolymer by the process of this invention and were, therefore, fusion-aids.

The organic liquids that are generally useful as fusion-aids for the class of methyl methacrylate copolymers of the present invention in most instances have solubility parameters ($\delta$) of at least 8.5 and preferably falling in the range of about 8.9 to 12.

The solubility parameter is defined as the square root of the ratio of energy of vaporization ($\Delta E$) of the liquid to a gas at zero pressure (i.e., infinite separation of the molecules) to the molal volume (V) of the liquid (i.e., the square root of the cohesive energy density). Expressed algebraically, it is as follows:

$$\delta = (\Delta E/V)^{1/2}$$

The basis for this definition is reviewed authoritatively by Harry Burrell in Interchemical Review, volume 14, Spring 1955, No. 1, page 3 (published at the Research Laboratories of Interchemical Corporation). Other references are:

Hildebrand, J., and Scott, R., "The Solubility of Non-Electrolytes," Third Edition, New York; Reinhold Publishing Corp., 1949.

Burrell, Official Digest Volume 27, 726–758, October 1955.

Small, J., Applied Chemistry 3, 71 (1953).

The following solvents having parameters of at least 8.9 are especially useful as fusion-aids:

| Solvent: | Parameter |
|---|---|
| Ethyl acetate | 9.1 |
| o-Xylene | 9.0 |
| Toluene | 8.93 |
| Chloroform | 9.4 |
| Trichloroethane | 9.4 |
| Pentachloroethane | 9.4 |
| Methylene chloride | 9.9 |
| 1,2-dichloroethane | 9.9 |
| 1,2-dichloroethylene | 9.9 |
| Tetrachloroethylene | 9.4 |
| o-Dichlorobenzene | 10.0 |
| Monochlorobenzene | 9.5 |

For some of the copolymers of the present invention especially those in which an ester of acrylic acid, such as ethyl acrylate, forms a large proportion (e.g., 25% or more by weight) of the polymerized units therein, carbon tetrachloride ($\delta=8.6$), butyl acetate ($\delta=8.5$), and dibutyl phthalate may be used.

As a practical matter it is preferable that the organic liquids selected as fusion-aids have boiling points above the temperature of the coagulating bath. Also, they should be volatile under the temperature conditions within which the filaments or films are processed, although they need not boil below these processing temperatures.

There may be incorporated as a fusion-aid from 1 to 40% by weight of one or more organic liquids meeting the above requirements, the percentage being based on the weight of the copolymer. Usually the weight of fusion-aid, if used, will be from 10 to 20% of the weight of copolymer. In some cases, the fusion-aid can be added to one or more of the comonomers at the time it is introduced into the polymerization vessel provided that the presence of the chosen organic liquid does not interfere with polymerization. In some cases of fusion-aid can be directly added to the dispersion of copolymer. This step can be taken if addition of organic liquid does not cause coagulation of the dispersion of copolymer. A way around this undesired phenomenon is to emulsify the organic liquid and add the resulting emulsion to the dispersion of copolymer.

The dispersions of thermoplastic resins here used are obtained by emulsifying a mixture of monomers containing at least 50% (and preferably at least 60%) of methyl methacrylate and at least one other copolymerizable monoethylenically unsaturated comonomer, and polymerizing the thus formed emulsion under the influence of a free-radical catalyst, usually in a redox system. The polymeric product when isolated and dried must have an apparent second order transition temperature, $T_g$, between 25° C. and 180° C. Mixtures of dispersions of different polymers and/or copolymers may also be used.

The apparent second order transition temperature ($T_g$) is defined as that temperature at which the first derivative of thermodynamic variables, such as coefficient of expansion or heat capacity, changes abruptly. This transition temperature is an inflection temperation which is conveniently found by plotting the modulus of rigidity against temperature. A convenient method for determining such modulus and transition temperature is described by Williamson, British Plastics 23, 87–90. The $T_g$ values here used are generally those temperatures at which the modulus is 300 kg./cm.$^2$.

The comonomer or comonomers used with the methyl methacrylate monomer may be of a wide variety, such as methyl, ethyl, propyl, butyl, or octyl acrylate, or ethyl, butyl, amyl, hexyl, or octyl methacrylate or ethoxyethyl or butoxyethylacrylate or methacrylate. These monomers are generically represented by the formula

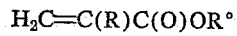

$$H_2C=C(R)C(O)OR°$$

wherein R is selected from the group consisting of H and methyl, and R° is selected from the group consisting of ($C_1$—$C_8$)-alkyl, ethoxyethyl and butoxyethyl.

A series of spinnable dispersions can be made, for example from methyl methacrylate and methyl acrylate, neither of which normally gives homopolymers with requisite properties for providing desirable fibers by spinning aqueous dispersions. Thus, a copolymer from 94% methyl methacrylate and 6% methyl acrylate by weight has a $T_g$ value of about 100° C.; an 80:20 copolymer has a $T_g$ of 80° C.; and a 60:40 copolymer has a $T_g$ of 66° C. All of these copolymers can be spun from stable dispersions thereof and yield useful fibers and films.

Another typical series of copolymers which are spinnable from aqueous dispersions by the process of this invention can be prepared from methyl methacrylate and ethyl acrylate in such proportions as to give $T_g$ values from about 100° to about 25° C. Thus, a spinnable copolymer from 95% methyl methacrylate and 5% ethyl acrylate by weight has a $T_g$ of 98° C., one from 90% methyl methacrylate and 10% ethyl acrylate 91° C., one from 70% methyl methacrylate and 30% ethyl acrylate 64° C., and one from 50% of each 37° C. In place of methyl or ethyl acrylates used above, mixtures thereof may be used or these acrylates may be replaced with other alkyl acrylates in suitable proportions to give copolymers having the required $T_g$ values.

Some typical copolymer compositions of this sort, starting with methyl methacrylate and propyl acrylate are 90:10 ($T_g$, 95° C.), 80:20 ($T_g$, 79° C.), and 60:40 ($T_g$, 55° C.).

Similarly, alkyl methacrylates starting with ethyl methacrylate may be copolymerized with methyl methacrylate. Useful copolymers can be made with methyl methacrylate and ethyl methacrylate in proportions such as 90:10 ($T_g$, 100° C.), 70:30 ($T_g$, 91° C.), and 50:50 ($T_g$, 81° C.).

Useful copolymers are obtained with methyl methacrylate up to 90% thereof with 10% propyl methacrylate ($T_g$, 99° C.). For example, useful copolymers are obtained from methyl methacrylate and propyl methacrylate in an 80:20 ratio ($T_g$, 92° C.), or 70:30 ($T_g$, 86° C.), or 50:50 ($T_g$, 73° C.).

A copolymer from methyl methacrylate and n-butyl methacrylate in a 90:10 weight ratio has a $T_g$ value of 93° C. and can be spun from dispersions. This is true also for other ratios, such as 80:20 ($T_g$, 86° C.), and 60:40 ($T_g$, 70° C.).

Polymers and copolymers from acrylic and methacrylic esters have unusual stability against light and oxygen and are colorless. Yet into the copolymers based on such esters there may be introduced groups from other polymerizable monovinylidene compounds, such as alkyl itaconates, styrene, vinyl ethers, and vinyl esters without destroying the valuable properties inherently possessed by the acrylic resins.

Copolymers from mixtures of methyl methacrylate with two or more other comonomers may also be used.

In the emulsion polymerization of monomers to give dispersions of polymeric products having the specified $T_g$ values there may be used any of the conventional emulsifiers, anionic, cationic, or non-ionic, such as sodium dodecyl sulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, dodecylbenzyltrimethylammonium chloride, or any of the many wetting agents and emulsifiers which are generally advocated for forming aqueous emulsions. Some emulsifiers are better for handling a given monomer or a mixture of monomers than others. But a few simple trials are needed to establish a good emulsifying system. In some cases, a mixture of agents is desirable. Amounts of emulsifying agent may vary from a few tenths percent to ten or more percent of the weight of monomer or monomers.

As polymerization initiator there may be used one or more of the peroxides or azo initiators, which act as free-radical catalysts and which are known to be effective between about 30° and 100° C., such as benzoyl peroxide, tert-butyl hydroperoxide, cumene hydroperoxide, tetralin peroxide, acetyl peroxide, caproyl peroxide, tert-butyl perbenzoate, or methyl ethyl ketone peroxide, or azodiisobutyronitrile, dimethyl azodiisobutyrate, etc. In aqueous systems ammonium, sodium, or potassium persulfate is generally most convenient, particularly when used in conjunction with a reducing agent, such as a sulfite, bisulfite, metabisulfite, or hydrosulfite, as of an alkali metal, to provide a redox system, which will start the polymerization reaction at a low or moderate temperature. Often the addition of a few parts per million of polyvalent metal, such as iron, accelerates the reaction. Monomer or mixture of monomers and/or catalyst may be added in small increments as the polymerization reaction proceeds. In this way, a dispersion is formed with a relatively high solids content. These dispersions do not have, however, a marked viscosity.

Aqueous dispersions containing at least 20% by weight of the methyl methacrylate polymer and a fusion-aid obtained in the general manner so far described can be spun through a spinneret or film-forming slit into alkaline aqueous coagulating baths containing from 5 to 50% by weight of an electrolyte. However, if desired, aqueous dispersions containing the fusion-aid and 20% by weight of the methyl methacrylate polymer can be made having a pH of at least about 7 which can be spun into acid aqueous coagulating baths by using acid-sensitive emulsifiers for the polymerization. The preparation of such dispersions and the formation of fibers, films, etc., therefrom are described in our Patent 2,914,376 above, and such description is incorporated herein by reference.

Whether the alkaline or acid coagulating bath is used, the coagulating bath is maintained at a temperature above the $T_g$ value of the solvated copolymer in the bath. The temperature of the aqueous dispersion fed to the orifice is usually between 20° and 50° C. The bath temperature is usually from 50° to 105° C. Copolymers with higher $T_g$ values should be passed through coagulating baths at relatively higher temperatures than those with lower $T_g$ values, although the $T_g$ of the solvated, coagulated polymer at this point, when a fusion-aid is present, will be considerably below the $T_g$ of the dry copolymer itself. The fusion-aid enables use of a lower bath temperatures or better results from a bath at a given temperature.

Whether the acid or alkaline coagulating procedure is used, the coagulated and partially coalesced structure is drawn at constant speed from the coagulating bath, optionally washed or neutralized, and passed through a drying zone where water is driven off. This is usually accomplished by passing the shaped object through a zone at a temperature between 60° and 400° C., preferably at 100° to 250° C.

Either during the drying operation or thereafter the shaped object is carried to a sufficiently high temperature to carry the shaped object above the $T_g$ value of the copolymer. As the copolymer is heated to temperatures at which water is driven off, together with other volatile materials, such as fusion-aids, the observable $T_g$ value increases to about the $T_g$ value for the dry copolymer in question. It is believed that the fusion-aid is, in effect, steam-distilled off with the water. The temperature of the shaped object is carried above this value but it is not carried to a point at which degradations or thermal mutations (i.e., evident changes in degree of polymer size or decomposition caused by heat) would occur. Usually a temperature is reached within the shaped object which is at least 30° C. above the $T_g$ of the dry copolymer.

Under these conditions there is effected sufficient coalescence of particles to give good cohesion, and some strength. Some retraction in yarn, filament, or film may occur unless tension is applied thereto.

Drying and joining of particles in the way described may be accomplished in one operation or in several steps. Generally, it is most convenient to bring about these effects in a single zone in which the temperature is high enough to promote coalescence as well as drying and the time is sufficient to allow these actions to proceed satisfactorily. The overall operation here is best described by the term "fuse-drying."

Thereafter, the fiber, film, or the like may be stretched and given other after-treatments, such as cross-linking.

In the examples following, which are illustrative of the present invention, the parts and percentages are by weight unless otherwise indicated.

*Example 1*

(a) To 200 parts of distilled water at room temperature is added 6 parts of an aqueous solution containing 2% of ferrous sulfate heptahydrate and 4% of the sodium salt of ethylenediaminotetraacetic acid adjusted to pH 4 with 0.5 N sulfuric acid solution. Then 3 parts of potassium laurate is added followed by 0.6 part of sodium formaldehyde sulfoxylate dihydrate. The pH of the solution is adjusted to 10.5 with 0.5 N NaOH. A mixture of 87 parts of methyl methacrylate and 13 parts of ethyl acrylate is added with stirring, and the air above the resulting emulsion is replaced by nitrogen. To the emulsion is now added 0.15 part of phenylcyclohexane hydroperoxide as a 10% solution in toluene. After a short induction period, polymerization starts as evidenced by a sharp temperature rise. The temperature is now controlled by cooling to remain in the range 35° to 40° C. Over 85% conversion to a dispersion of fine particle size (less than 0.1 micron in diameter) is achieved in about one-half hour after addition of the phenylcyclohexane hydroperoxide. The dry copolymer contained in this dispersion has a $T_g$ of about 73° C.

The dispersion prepared as described above is metered at the rate of 2.8 grams per minute through a spinneret into a coagulating bath. The spinneret consists of a platinum alloy. It has a face diameter of 0.5 inch and contains 40 holes each of 0.0025 inch diameter. The coagulating bath is an aqueous solution containing 4.0% hydrogen chloride and 0.6% ferric chloride which is maintained at 86° C. The bundle of filaments formed is drawn through the bath at the rate of about ten meters per minute. The immersion in the bath is three inches. The yarn is washed slightly with water at room temperature and dried in contact with a metal surface at 145° C. It is then passed over rolls revolving at differential speeds to stretch the yarn about 600%. During this operation, the yarn is heated to about 120° C.

The resulting yarn is lustrous and white and has the following properties:

Denier, 144;
Tenacity (65% RH, 72° F.), 1.0 gram per denier; and
Extensibility (65% RH, 72° F.), 10%.

(b) The same procedure is followed as in part (a) except 20 parts of toluene emulsified in 40 parts of water is added to the latex after the polymerization is substantially complete. (Toluene passes the "fusion-aid" test.) The yarn coming from the spinneret is stronger than yarn at this point as prepared in part (a).

The resulting yarn has the following properties:

Denier, 14;
Tenacity (65% RH, 72° F.), 2.0 grams per denier; and
Extensibility (65% RH, 72° F.), 10%.

*Example 2*

An aqueous dispersion was prepared by emulsion polymerization with the aid of a non-ionic emulsifier. It contained particles less than about 0.1 micron in diameter of a copolymer derived from 90% of methyl methacrylate and 10% of ethyl acrylate by weight and had a 40% content of this copolymer. Then twelve parts of ethyl acetate was mixed into 100 parts of the dispersion. The dispersion was forced under constant pressure through a glass capillary of 0.009 inch diameter into an aqueous 30% sodium hydroxide solution at 105° C. The resulting filament was passed through a bath containing 50% acetic acid and washed with water. It was passed through an oven at about 200° C., heat-stretched at about 150%, and cooled to about 40° C. in air. The resulting filament had a tensile strength of 2 grams per denier and a breaking extensibility of 28% at 65% relative humidity and 72° F. The filament had a denier of 21.

*Example 3*

(a) There were mixed 31 parts by weight of ethyl acrylate, 64 parts of methyl methacrylate, and 5 parts of 2-hydroxyethyl vinyl sulfide. This mixture was stirred into 120 parts of an aqueous solution containing 5 parts of an octylphenoxypolyethoxyethanol as emulsifier. Thereto were added 2 parts of ammonium persulfate dissolved in about 6 parts of water, followed by one part of sodium hydrosulfite in 10 parts of water. The mixture was stirred with polymerization starting and carrying the temperature to about 65° C. The resulting dispersion was cooled to 30° C. and 8 parts of butyl acetate was added. This was passed through a 40-hole spinneret at one gram per minute into an aqueous 30% sodium hydroxide solution at 70° C. with formation of filament at the rate of 6 meters per minute. The filament was washed, dried, and stretched 220%. The resulting filament had a denier of 188, a tensile strength of 1.5 gram per denier, and an extensibility of 15%.

(b) Part (a) was repeated substituting 10 parts of dibutyl phthalate for the butyl acetate. Filaments of similar properties were obtained.

(c) Part (a) was repeated substituting 12 parts of carbon tetrachloride for the butyl acetate. Filaments of similar properties were obtained.

*Example 4*

Another copolymer was prepared from 16 parts of ethyl acrylate, 64 parts of methyl methacrylate, 10 parts of omegahydroxypentyl vinyl ether, and 10 parts of aminoisobutyl vinyl ether in a non-ionic dispersion at about 40% solids. Then 15 parts of xylene (per 100 parts of the dispersion) was mixed into the dispersion. This dispersion was passed at one gram per minute through a 40-hole spinneret into an aqueous 30% sodium hydroxide solution at 70° C. through which the resulting filament traveled at 3.5 meters per minute for a distance of 20 cm. The filament was washed with a water spray, passed through a bath of 10% acetic acid, and passed through a tower heated at 200° C. It was then stretched 174% with an environment at 200° C. and cooled to 30° C. This filament had a tensile strength of 1.7 gram per denier, an extensibility of 5%, and a denier of 376.

*Example 5*

(a) A copolymer in a non-ionic 40% dispersion was prepared as above from 21 parts of ethyl acrylate, 64 parts of methyl methacrylate, 10 parts of omega-hydroxypentyl vinyl ether, and 5 parts of β-aminoethyl vinyl ether. Then 13 parts of ethylene dichloride (per 100 parts of the dispersion) was mixed into it. The resulting dispersion was then passed through a 40-hole spinneret at 0.8 gram per hour and the resulting filaments passed through 20 cm. of an aqueous 30% sodium hydroxide solution at 70° C. at the rate of 4 meters per minute. The filaments were washed with water, 20% acetic acid, and water, were heated in a tower at 200° C., stretched 96% at about 200° C., and cooled to about 35° C. This yarn gave a tensile strength of 1.8 gram per denier, and an extensibility of 50%. It had a denier of 368.

(b) Part (a) was repeated substituting 13 parts of chloroform for the ethylene dichloride. Filaments of similar properties were obtained.

(c) Part (a) was repeated substituting 13 parts of trichloroethane for the ethylene dichloride. Filaments of similar properties were obtained.

(d) Part (a) was repeated substituting 13 parts of pentachloroethane for the ethylene dichloride. Filaments of similar properties were obtained.

(e) Part (a) was repeated substituting 13 parts of methylene chloride for the ethylene dichloride. Filaments of similar properties were obtained.

(f) Part (a) was repeated substituting 13 parts of 1,2-dichloroethylene for the ethylene dichloride. Filaments of similar properties were obtained.

(g) Part (a) was repeated substituting 13 parts of tetrachloroethylene for the ethylene dichloride. Filaments of similar properties were obtained.

(h) Part (a) was repeated substituting 13 parts of monochlorobenzene for the ethylene dichloride. Filaments of similar properties were obtained.

(i) Part (a) was repeated substituting 13 parts of o-dichlorobenzene for the ethylene dichloride. Filaments of similar properties were obtained.

It is to be understood that changes and variations may be made without departing from the spirit and scope of the invention as defined in the appended claims.

We claim:

1. A composition adapted to be formed into fibers and films comprising an aqueous dispersion containing water, at least about 20% by weight of dispersed particles of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of $(C_1-C_8)$-alkyl, ethoxyethyl and butoxyethyl, and from 1 to 40% by weight, based on the weight of copolymer, of an organic liquid which has a solubility parameter of 8.5 to 12, said organic liquid being substantially completely dissolved within the copolymer particles in the dispersion.

2. A composition adapted to be formed into fibers and films comprising an aqueous dispersion containing water, at least about 20% by weight of dispersed particles of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of $(C_1-C_8)$-alkyl, ethoxyethyl and butoxyethyl, and from 1 to 40% by weight, based on the weight of the copolymer, of an organic liquid which has a solubility parameter of 8.5 to 12, comprising at least one member selected from the group consisting of toluene, xylenes, ethyl acetate, butyl acetate, dibutyl phthalate, carbon tetrachloride, chloroform, methylene chloride, ethylene chloride, trichloroethanes, pentachloroethane, 1,2-dichloroethylene tetrachloroethylene, monochlorobenzene, and o-dichlorobenzene, said organic liquid being substantially completely dissolved within the copolymer particles in the dispersion.

3. A composition as defined in claim 2 in which the copolymer contains 60 to 90% by weight of methyl methacrylate.

4. A composition as defined in claim 2 in which the copolymer contains 60 to 90% by weight of methyl methacrylate and 10 to 40% of at least one ester of acrylic acid.

5. A composition adapted to be formed into fibers and films comprising an aqueous dispersion containing at least about 20% by weight of dispersed particles of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of $(C_1-C_8)$-alkyl, ethoxyethyl and butoxyethyl comprising at least 50% by weight of methyl methacrylate, and from 1 to 40% by weight, based on the weight of copolymer, of toluene substantially completely dissolved within the copolymer particles in the dispersion.

6. A composition adapted to be formed into fibers and films comprising an aqueous dispersion containing at least about 20% by weight of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of $(C_1-C_8)$-alkyl, ethoxyethyl and butoxyethyl comprising at least 50% by weight of methyl methacrylate, and from 1 to 40% by weight, based on the weight of copolymer, of xylene substantially completely dissolved within the copolymer particles in the dispersion.

7. A composition adapted to be formed into fibers and films comprising an aqueous dispersion containing at least about 20% by weight of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl and R° is selected from the group consisting of ($C_1$—$C_8$)-alkyl, ethoxyethyl and butoxyethyl comprising at least 50% by weight of methyl methacrylate, and from 1 to 40% by weight, based on the weight of the copolymer, of ethyl acetate substantially completely dissolved within the copolymer particles in the dispersion.

8. A composition adapted to be formed into fibers and films comprising an aqueous dispersion containing at least about 20% by weight of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of ($C_1$—$C_8$)-alkyl, ethoxyethyl and butoxyethyl comprising at least 50% by weight of methyl methacrylate, and from 1 to 40% by weight, based on the weight of the copolymer, of butyl acetate substantially completely dissolved within the copolymer particles in the dispersion.

9. A composition adapted to be formed into fibers and films comprising an aqueous dispersion containing at least about 20% by weight of a water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of ($C_1$—$C_8$)-alkyl, ethoxyethyl and butoxyethyl comprising at least 50% by weight of methyl methacrylate, and from 1 to 40% by weight, based on the weight of the copolymer, of ethylene dichloride substantially completely dissolved within the copolymer particles in the dispersion.

10. A composition adapted to be formed into fibers and films comprising an aqueous dispersion containing at least about 20% by weight of a water-insoluble emulsion copolymer of a mixture of 60 to 90% by weight of methyl methacrylate with 10 to 40% by weight of ethyl acrylate, and from 1 to 40% by weight, based on the weight of copolymer, of toluene substantially completely dissolved within the copolymer particles in the dispersion.

11. A composition adapted to be formed into fibers and films comprising an aqueous dispersion containing at least about 20% by weight of a water-insoluble emulsion copolymer of a mixture of 60 to 90% by weight of methyl methacrylate with 10 to 40% by weight of ethyl acrylate, and from 1 to 40% by weight, based on the weight of the copolymer, of xylene substantially completely dissolved within the copolymer particles in the dispersion.

12. A composition adapted to be formed into fibers and films comprising an aqueous dispersion containing at least about 20% by weight of a water-insoluble emulsion copolymer of a mixture of 60 to 90% by weight of methyl methacrylate with 10 to 40% by weight of ethyl acrylate, and from 1 to 40% by weight, based on the weight of the copolymer, of ethyl acetate substantially completely dissolved within the copolymer particles in the dispersion.

13. A composition adapted to be formed into fibers and films comprising an aqueous dispersion containing at least about 20% by weight of a water-insoluble emulsion copolymer of a mixture of 60 to 90% by weight of methyl methacrylate with 10 to 40% by weight of ethyl acrylate, and from 1 to 40% by weight, based on the weight of the copolymer, of butyl acetate substantially completely dissolved within the copolymer particles in the dispersion.

14. A composition adapted to be formed into fibers and films comprising an aqueous dispersion containing at least about 20% by weight of a water-insoluble emulsion copolymer of a mixture of 60 to 90% by weight of methyl methacrylate with 10 to 40% by weight of ethyl acrylate, and from 1 to 40% by weight, based on the weight of the copolymer, of ethylene dichloride substantially completely dissolved within the copolymer particles in the dispersion.

15. A composition adapted to be formed into fibers and films comprising an aqueous dispersion containing water, at least about 20% by weight of dispersed particles of water-insoluble emulsion copolymer of a mixture of at least 50% by weight of methyl methacrylate and at least on other monomer selected from the group consisting of those of the formula $$H_2C=C(R)C(O)OR°$$

wherein R is selected from the group consisting of H and methyl, and R° is selected from the group consisting of ($C_1$—$C_8$)-alkyl, ethoxyethyl and butoxyethyl comprising at least 50% by weight of methyl methacrylate, from a few tenths percent to ten percent by weight, based on the weight of monomers, of an emulsifier therefor, and from 1 to 40% by weight, based on the weight of the copolymer, of an organic liquid which has a solubility parameter of 8.5 to 12, said organic liquid being substantially completely dissolved within the copolymer particles in the dispersion.

16. A composition adapted to be formed into fibers and films comprising an aqueous dispersion containing water, at least about 20% by weight of dispersed particles of water-insoluble emulsion copolymer of a mixture of at least 50% by weight of methyl methacrylate and at least one other monomer selected from the group consisting of those of the formula $$H_2C=C(R)C(O)OR°$$

wherein R is selected from the group consisting of H and methyl, and R° is selected from the group consisting of ($C_1$—$C_8$)-alkyl, ethoxyethyl and butoxyethyl comprising at least 50% by weight of methyl methacrylate, from a few tenths percent to ten percent by weight, based on the weight of monomers, of an emulsifier therefor, and from 1 to 40% by weight, based on the weight of the copolymer, of an organic liquid which has a solubility parameter of 8.5 to 12, comprising at least one member selected from the group consisting of toluene, xylenes, ethyl acetate, butyl acetate, dibutyl phthalate, carbon tetrachloride, chloroform, methylene chloride, ethylene chloride, trichloroethanes, pentachloroethane, 1,2-dichloroethylene tetrachloroethylene, monochlorobenzene, and o-dichlorobenzene, said organic liquid being substantially completely dissolved within the copolymer particles in the dispersion.

References Cited in the file of this patent
UNITED STATES PATENTS

| | | |
|---|---|---|
| 2,361,270 | Collins et al. | Oct. 24, 1944 |
| 2,471,742 | Harrison | May 31, 1949 |
| 2,471,743 | Harrison | May 31 1949 |
| 2,793,195 | Vesce | May 21, 1957 |